Jan. 6, 1931. H. M. GRIMES Re. 17,919

GAME

Original Filed March 7, 1916 5 Sheets-Sheet 1

INVENTOR.
H. M. Grimes,
BY Hackley Morrison, assignee,
by Stone, Boyden, Mack & Hahn
ATTORNEYS Jan. 6, 1931. H. M. GRIMES Re. 17,919

GAME

Original Filed March 7, 1916 5 Sheets-Sheet 2

INVENTOR.
H. M. Grimes,
BY Hackley Morrison,
Assignee,
by Stone, Boyden, Mack & Hahn,
ATTORNEYS

GAME

Original Filed March 7, 1916 5 Sheets-Sheet 3

Inventor
H. M. Grimes,
by Hackley Morrison,
assignee,
By Stone, Boyden, Mack & Hahn,
Attorneys Jan. 6, 1931. H. M. GRIMES Re. 17,919
GAME
Original Filed March 7, 1916 5 Sheets-Sheet 4
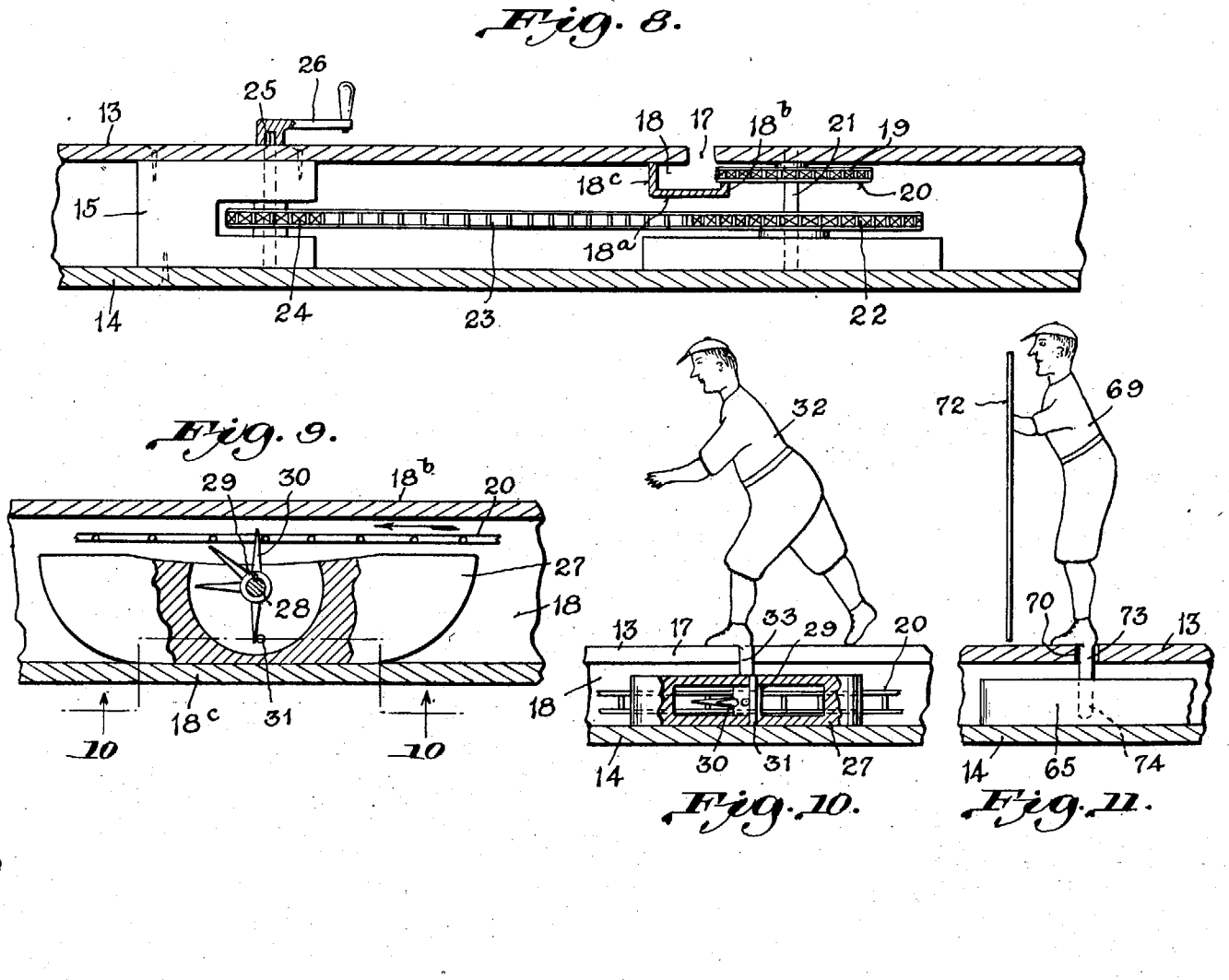
Inventor
H. M. Grimes,
by
Hackley Morrison,
Assignee,
By Stone, Boyden, Mack & Hahn,
Attorneys Jan. 6, 1931. H. M. GRIMES Re. 17,919

GAME

Original Filed March 7, 1916 5 Sheets-Sheet 5

INVENTOR.
H. M. Grimes,
BY Hackley Morrison,
assignee,
by Stone, Boyden, Mack & Hahn,
ATTORNEYS.

Reissued Jan. 6, 1931

Re. 17,919

UNITED STATES PATENT OFFICE

HARRY M. GRIMES, DECEASED, LATE OF KOKOMO, INDIANA, BY HACKLEY MORRISON, OF RICHMOND, VIRGINIA, ASSIGNEE

GAME

Original No. 1,285,132, dated November 19, 1918, Serial No. 82,555, filed March 7, 1916. Application for reissue filed October 22, 1930. Serial No. 490,520.

This invention relates to game boards, and particularly to a game board upon which may be played a game of baseball.

The primary object of the invention is to provide a board upon which are positioned a number of figures representing the various factors necessary to playing the game of baseball, the arrangement involving means for actuating the various figures to simulate the movements and actions of men players in their respective positions upon an actual ball field, and to carry into effect the various plays common to a real baseball game.

With these objects in view, together with others which will appear as the description proceeds, the invention resides in the novel combination and arrangement of parts all as will be more fully described hereinafter, illustrated in the drawings, and particularly pointed out in the claims.

In the drawings:

Figure 8 is an enlarged sectional view taken on line 8—8 of Figure 4;

Figure 9 is a fragmentary sectional plan view illustrating the connection between the base running figures and their cars;

Figure 10 is a sectional view taken on line 10—10 of Figure 9;

Figure 11 is a side elevation of a figure representing one of the outfielders for the game;

Figure 1:
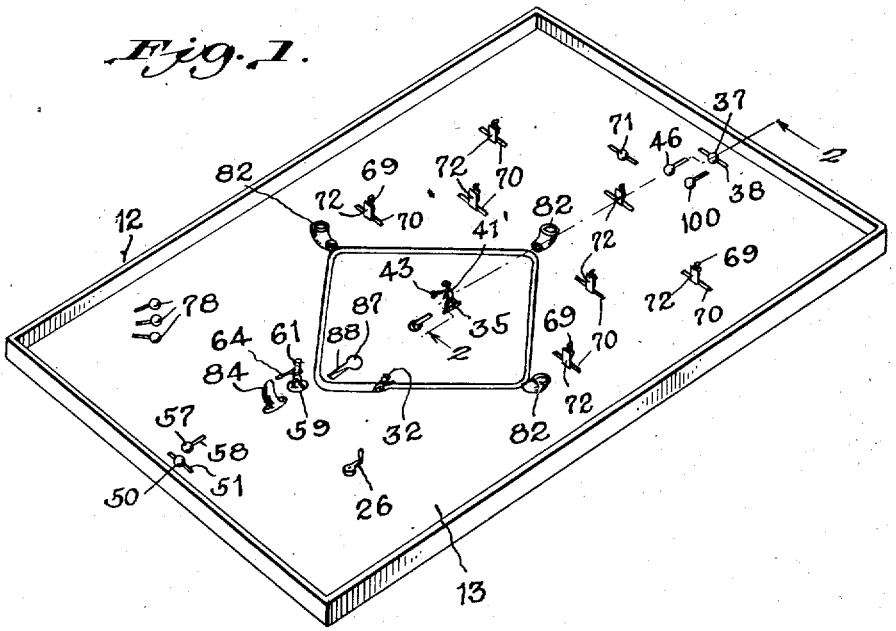
Figure 1 is a perspective view of a game board constructed and arranged in accordance with the invention.
Figure 2:
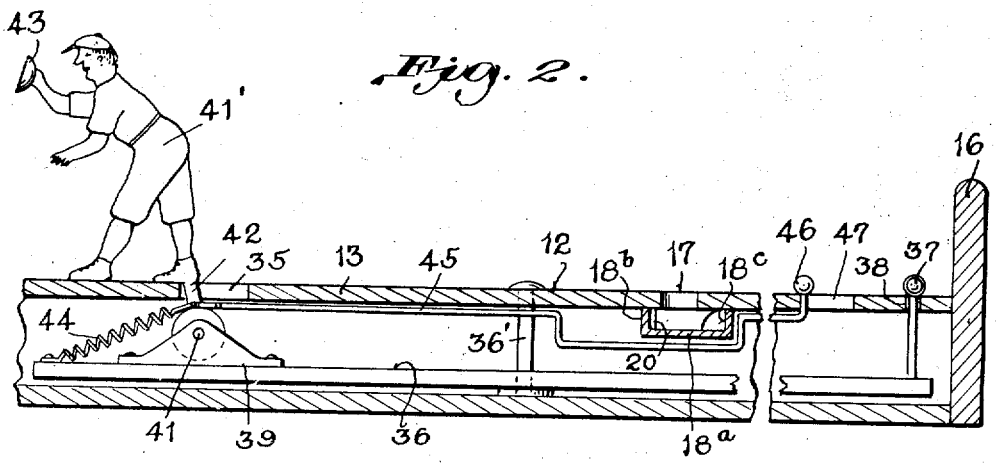
Figure 2 is an enlarged sectional view taken on line 2—2 of Figure 1.
Figure 3:
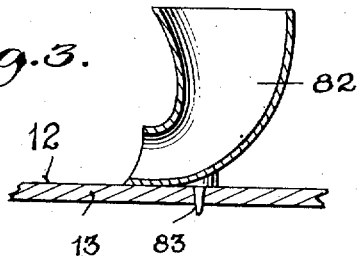
Figure 3 is a similar view of one of the ball catching devices.
Figure 4:
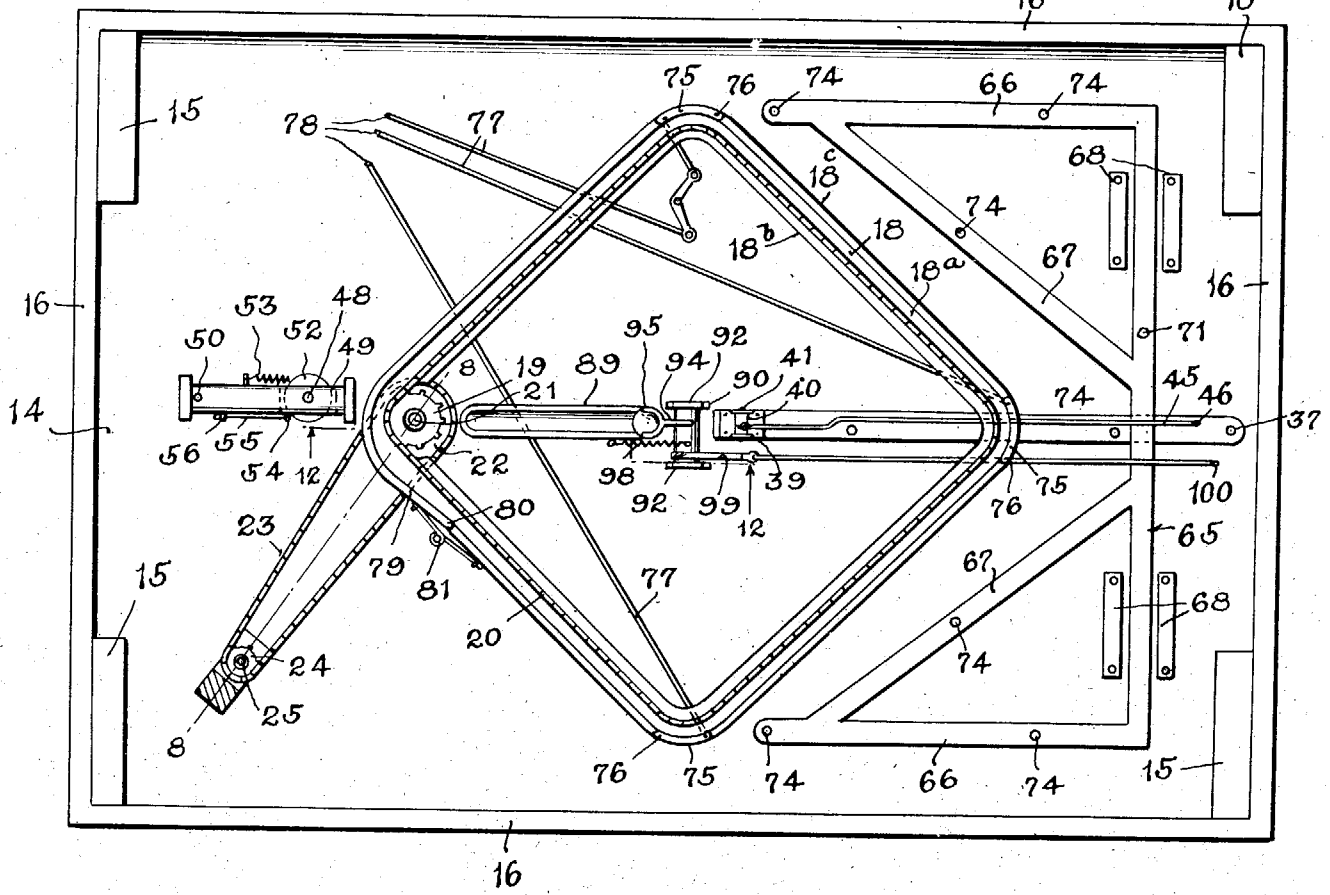
Figure 4 is a top plan view of the game board, the top being removed, and showing the various movable parts of the device.
Figure 5:
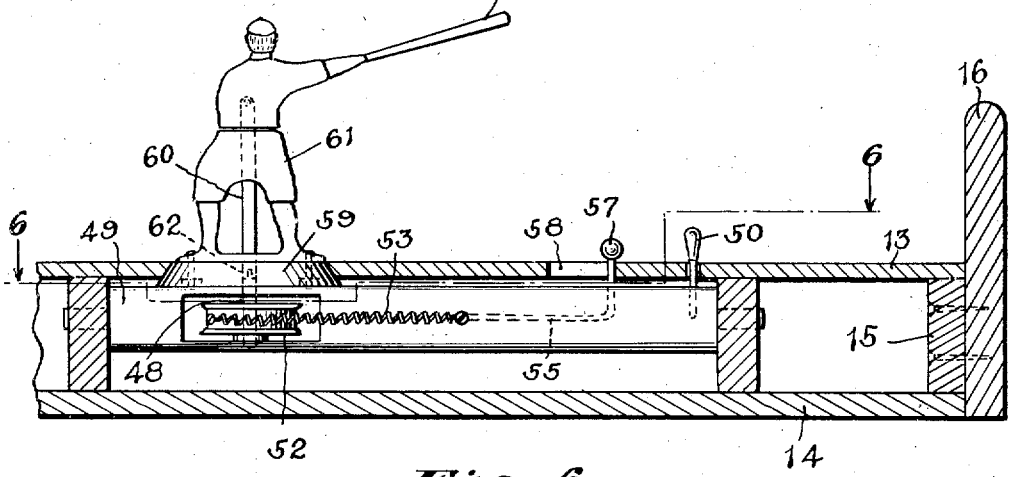
Figure 5 is a detail elevational view of the figure representing a batter, and its operating mechanism, the board being shown in section.
Figure 6:
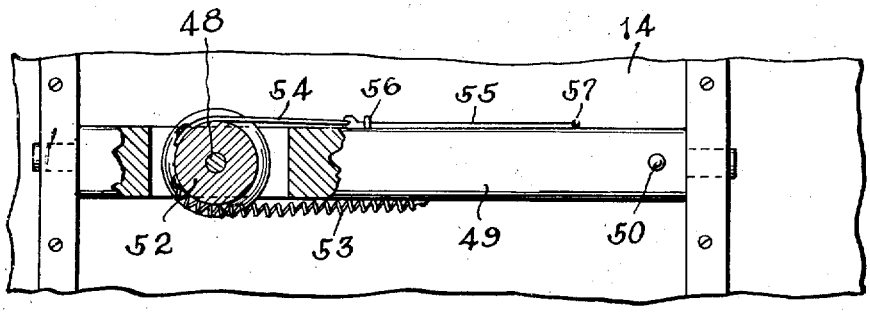
Figure 6 is a sectional plan view taken on line 6—6 of Figure 5.
Figure 7:
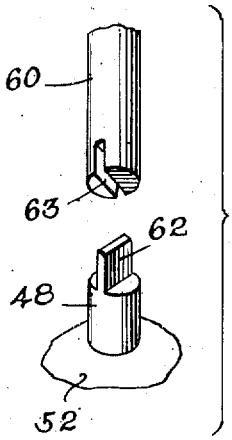
Figure 7 is a detail perspective view showing the connection, between the figure and its supporting mechanism.
Figure 12:
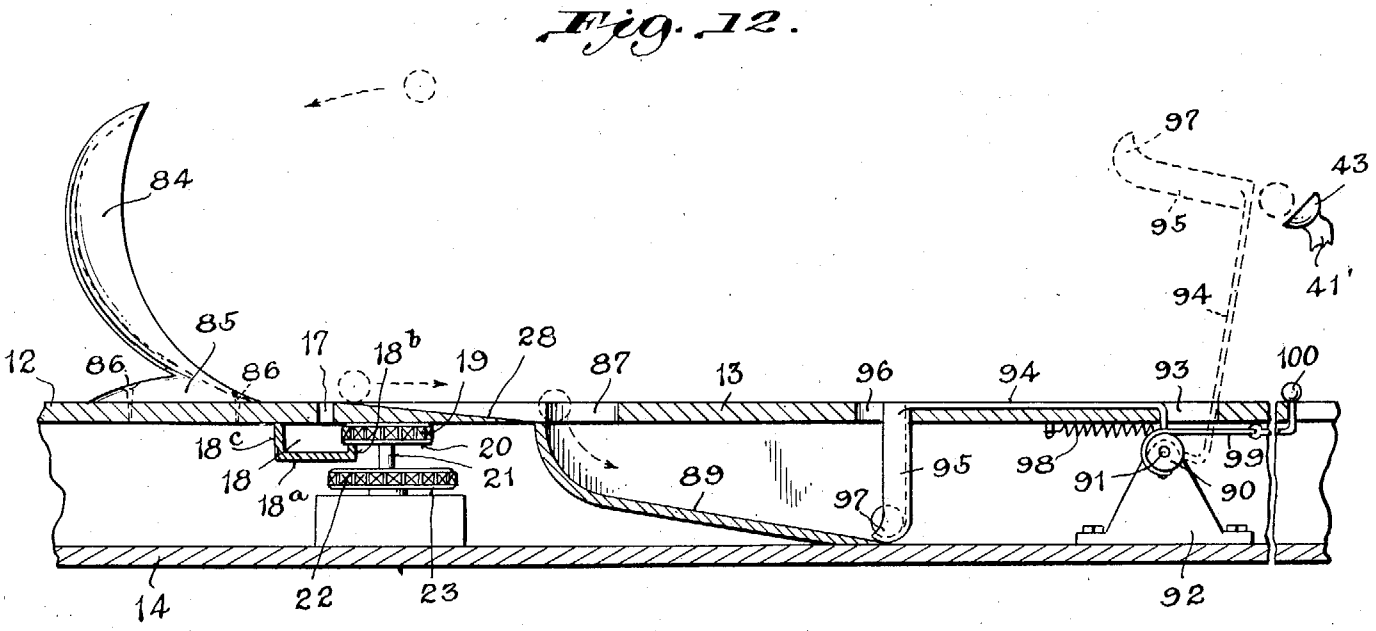
Figure 12 is a sectional view taken on line 12—12 of Figure 4.
Figure 13:
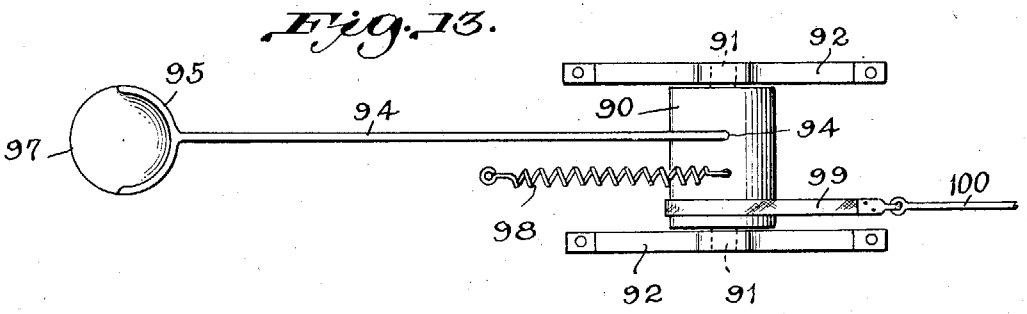
Figure 13 is an enlarged plan view of a portion of the device shown in Figure 12.

Referring to the drawings, 12 indicates the game apparatus in its entirety, the said apparatus comprising an upper board 13, constituting the playing field, and a lower board or bottom 14, these boards being co-extensive with each other and spaced apart by means of blocks 15 to provide a chamber. Strips 16 project above the upper surface of the board 13 at the edges thereof to prevent the balls used in playing the game from rolling beyond the game board.

The upper board 13 is provided inwardly from its edges with a rectangular or diamond shaped figure, the same being painted thereon to represent the base paths for the field. A slot 17 is provided in the board 13 and is co-extensive with the base paths, this diamond shaped slot constituting a trackway. A channel 18 is arranged beneath this slot and communicates with the latter at its upper open side. This channel comprises a bottom $18^a$ and sides $18^b$, $18^c$ respectively; the side $18^b$ lying relatively close to the innermost edge of the slot 17 throughout the extent of the latter, while the side wall $18^c$ is arranged beyond the corresponding edge of the slot 17. The purpose of this construction will appear later.

Located beneath the board 13 adjacent one corner of the diamond is a sprocket wheel 19, a chain 20 being trained over said sprocket and resting within the channel 18 beneath the slot and being co-extensive therewith. The shaft 21 which supports the sprocket wheel 19 is also equipped with a power sprocket 22, over which passes a power chain 23 adapted to receive power from a sprocket 24, secured upon a shaft 25 remote from the diamond and operated or rotated by means of a detachable handle 26. Upon operation of the handle 26 it is obvious that the chain resting against the wall $18^b$ of the channel 18 beneath the slot 17 will be driven around the same throughout the extent of the base paths. A car 27 is mounted for sliding movement within the channel 18, and is provided with a vertically disposed shaft 28, to which is secured a toothed sector 29, the teeth of which are adapted to engage in the links of the chain 20. A stop or pin 31 is arranged on the car 27 in such position as to limit the movement of the sector to 180 degrees in each direction. A game piece 32 indicating a man in the act of running is provided with a stem 33 projecting downwardly from one of his feet to be detachably secured to the shaft 28, and it is apparent the movement of the chain 20 within the channel 18 will, through the car 27, cause the figure 32 to travel around the base paths in the slot or trackway 17. The chain and sector arrangement is such that initial movement of the chain will cause the sector and its supporting shaft to rotate 180 degrees, or until the stop 31 is engaged by the outermost of the teeth 30, and this action causes a similar movement to the figure 33. When the movement of the chain 20 is reversed a similar action takes place, whereby the figure 32 will at all times first face in the direction of movement of the chain before actually traveling with the same. The ends of the car 27 are rounded as at 34 to permit of the same sliding around similar shaped corners in the channel 18 at the juncture of the various base paths.

Located centrally of the diamond shaped figure is the pitcher's box or position. A slot 35 is made in the upper board 13 to extend laterally of the diamond. A rock bar 36 is pivoted at 36′ within the chamber between the upper and lower boards of the field to extend at right angles to the slot 35 and beneath the same. A handle 37 is secured at one end of the bar 36 to project through a slot 38 in the board 13 whereby the bar 36 may be rocked. A block 39 is mounted upon the upper surface of the bar 36 beneath the slot 35, and a cylinder 40 is pivoted as at 41 for rocking movement about its own axis in said block longitudinally of the bar 36 and laterally of the slot 35. A figure 41′ representing a man in the act of throwing a ball has one of his feet provided with a stem 42 for attachment to the cylinder 40. The outstretched hand of the figure is provided with a cup 43 for the reception of a ball, the said cup being so arranged as to hold a ball when the figure is in its rearwardly tilted or retracted position, and has its open end facing in the direction of the home base of the diamond. A contractile spring 44 connects the upper side of the cylinder 40 with the forward portion of the bar 36, whereby the former is normally held at the limit of its forward movement. To facilitate retracting the figure 40′ against the tension of the spring 44, a trigger member 45 is provided. This member is connected at its forward end to said cylinder and extends rearwardly therefrom to terminate in a grip member 46 projecting upwardly through a slot 47 formed in the board 13 remote from the pitcher's box or position, and outside of the diamond shaped slot. In operation, the trigger 45 is retracted until the figure is in extreme rearward tilted position. A ball is placed in the cup 43 and the trigger is released whereupon the spring 44 violently rocks the figure to forward position, and the ball is thrown from the cup in the direction of the home base of the diamond where a batsman is positioned. Thus the cylinder 40, stem 42 and figure 41′ together form a lever or member pivoted to swing in a vertical plane and constituting a ball delivering device, the forward and rearward movements of such device being limited by engagement of the stem 42 with the edges of the slot 35. By oscillating the rock bar 36 lengthwise of the slot 35 it is obvious that the figure 41′ will be turned more or less, and such turning will cause the ball to be thrown to either side or across the center of the home base, accordingly as the figure is turned.

A shaft 48 is mounted for rotation in a bar 49 adjacent one corner of the diamond, the said corner being designated the home-base. The bar 49 is pivotally mounted to rock about a longitudinal axis, and is provided with a handle 50 projecting through a slot 51 formed to extend transversely of the board in the rear of the home base. The shaft 48 carries a pulley or drum 52, to the periphery of which is secured one end of a contractile spring 53, the opposite end of the spring being secured to one side of the bar 49. Secured to the periphery of the pulley opposite to the point of connection of the spring 53 is one end of a flexible member 54 which may be in the form of a strap which is attached at its opposite end to a trigger rod 55 mounted for sliding movement in suitable keepers 56 on the adjacent side of the bar 49, the said trigger bar terminating in an upwardly extending finger grip 57 projecting through a slot 58 in the board 13. A block 59 is secured to the upper surface of the rock bar 49, the said block being provided with a central orifice through which a stem 60 secured to the upper part of a figure 61 extends for connection with the adjacent end of the shaft 48, the stem being journalled in the lower part of said figure. This stem is cut away to form a tongue 62 to engage within a socket 63 arranged on the stem end, whereby a connection between the members is effected, such as will permit of the ready removal of the figure 61 from the board. The figure represents a batsman in the act of striking at a ball, having a bat 64 in his extended arms, and thus constituting a batting device. The spring 53 normally holds the pulley in such position that the figure carried thereby is at the extreme limit of striking position, and retraction of the trigger 55 will cause the figure to turn and assume a position ready to strike. Releasing of the trigger allows the spring 53 to rapidly swing the upper part of the figure to strike at a ball delivered from the pitching figure heretofore described. The rock bar upon which the batsman figure is mounted may be moved accordingly as the pitching figure is inclined, it being understood that there is sufficient clearance between the block 59 and the adjacent edges of the opening in the board 13 in which it is located, to permit such slight rocking movement as required. It is also obvious that various slight reciprocating movements of the trigger 55 will cause the figure representing the batter to simulate the movements of a batter during an actual game. By permitting the trigger to move only a slight distance forward, the bat held by the figure will be disposed directly over the home plate, whereupon the "bunt" hit common to a baseball game may be actually made.

Mounted for lateral sliding movement in the chamber between the boards 13 and 14, and adjacent the outer end of the field is a frame 65. This frame includes forwardly extending spaced arms 66, and angularly disposed bars 67 connecting the same arms with the base of the frame. Guide blocks 68 are secured to the base board 14 to hold the frame 65 in proper sliding position. Figures 69 are secured at various points in the extent of the frame to project through slots 70 in the board 13 of the field. These figures represent the first, second and third basemen, the short stop, and the left, center and right fielders respectively, and are arranged upon the frame according to the true position to be assumed by such players. A handle 71 is attached to the frame 65 to permit the latter to be manipulated. By imparting sliding movement to the frame 65 the figures carried thereby may be shifted to "play" such positions as may be desired. The figures 69 representing the fielders are each equipped with a plate 72 to contact a ball batted by the batsman 61, and pegs 73 may be arranged to project from the feet of the figures to extend through the slots 70 into suitable sockets 74 in the frame 65.

Arranged in the outermost walls 18[c] of the channel 18 at the corners of the diamond representing first, second and third bases are gates 75. These gates are pivoted at one end as at 76 to swing outwardly, rods 77 being connected to each gate at one end and being extended therefrom to a remote corner of the field to present finger grips 78 extending through suitable openings in the board 13. There is a similar gate 79 in said channel member slightly to the right of the home plate, pivoted at 80, the said gate being opened or closed by a suitable knob (not shown), and a spring 81 holds the said gate normally open. The gates at the various bases are slightly curved as shown, and when the cars carrying the base runners approach, the gates being held closed by the rods 77, the said cars will be permitted to round the corner of the channel and continue on to the next base, but should the control rods be released the cars will crowd against and force the gates outwardly slightly to permit the car being disengaged from the chain 20. The car will remain in this position until the gate is closed to force the same into operative connection with the chain. It is obvious that the various base runner cars may be thus selectively manipulated to halt or advance as desired to properly simulate the activities of a runner in an actual game. When a batter is "up" or having his turn at bat, a runner figure is positioned upon a car and the latter rests in position at the right of the home plate against the gate 79 and out of contact with the chain 20. When the ball is struck the gate 79 may be forced closed against the tension of spring 81, whereupon the sector on said car comes into operative engagement with the traveling chain and the runner is made to advance to first base.

Each base is equipped with a catching device in the shape of a funnel 82, the same being flared and open at its upper end and being curved and contracted to provide an outlet at its opposite end to deliver the balls to the playing field. It is to be understood that a ball dropped into one of these catchers is to be credited as a "catch" by the respective basemen. Pegs 83 may be secured to project from the under side of the funnels to secure the latter detachably to the playing field. It is thus seen that all of the figures and equipment may be readily removed from the playing field when desired.

In order that a ball thrown from the pitching figure to the batting figure which the latter lets go past or fails to hit may be returned to the pitching figure without being touched by the hands of the game operators, a catching device is employed. This device comprises a relatively large cup shaped member 84 secured to the board 13 directly behind the batting figure in such manner that all balls thrown in that direction and which pass the batter will be directed into the same. This catcher may be secured at one edge to a block 85, the latter being secured to the field board by screws 86, whereby the device may be conveniently removed when desired. An opening 87 is made in the board 13 slightly in advance of the home plate, and the immediate upper surface of the said board is slanted or beveled as at 88 to direct balls discharged or deflected from the catcher 84 into the opening 87. From the opening 87 the balls are conducted beneath the field board 13 toward the center of the diamond in the inclined trough or runway 89. Mounted for oscillation beneath the board 13 slightly in advance of the pitching figure is a roller 90. This roller may be provided with laterally projecting pintles 91 resting in suitable bearings in supporting blocks 92, the said roller being mounted for oscillation in the direction of the home plate and second base. A slot 93 is formed through the board 13 just above the roller 90, and an arm or lever 94 is secured at one end to said roller and projects up through this slot. This arm normally lies flat upon the board 13 in a forward direction. The forward free end of the arm 94 is equipped with a collector member 95, the latter projecting downwardly through an opening 96 in the board 13. This collector normally extends at its lower end to the bottom of the inclined way 89, is trough shape in construction, and is provided at its extremity with a ball retaining lip 97. The distance between the collector 95 and its rocking base 90 is equal to that between the ball retaining cup in the pitcher figure's outstretched hand when in rearward or retracted position and the said roller 90, and it is obvious that reverse rocking movement of the roller 90 will cause the arm 94 to swing rearwardly in a vertical plane and to deliver a ball carried by the collector through the rear open end of the latter into the cup held in the pitcher figure's hand. To normally hold the arm in operative horizontal position a spring 98 is employed, the said spring being connected at one end to the roller 90 and at its opposite end to a fixed part of the game board, and it is apparent that this construction yieldably holds the roller and its related parts in forwardly extended or ball receiving position. A strap 99 may be secured at one end to an actuating lever 100 projecting through a suitable opening in the face of the board 13 in the rear of the pitcher figure, and outside of the diamond, whereby the roller may be oscillated rearwardly to deliver a ball to the cup held by the pitcher figure.

While the above is a description of the preferred embodiment of the invention, it is apparent that various changes may be made in the minor details of construction and arrangement of parts without departing from the spirit of the invention or the scope of the claims.

What is claimed is:

1. In a device of the class described, a board, means for projecting a ball above and horizontally across said board, a cup having its open end lying in the path of said ball and having its lower end open and communicating with said board, the said board being provided with an opening in advance of said cup, an inclined surface beneath said opening, and means for returning a ball from said surface to said ball projecting means substantially as described.

2. In a device of the class described, a board, a ball delivering means on said board, a ball collecting means, the said latter means comprising a roller, an arm on said roller, a trough on said arm, a spring for holding said arm in forward position, and means for retracting said arm to aline said trough with said ball delivering means, substantially as described.

3. In a device of the class described, in combination, a horizontal board having an opening therethrough and also provided with a diamond shaped slot constituting a trackway, means for making figures move in said trackway, a ball delivering device comprising a member pivotally mounted within said diamond shaped slot at a point below said board to swing in a vertical plane and provided with a ball receiving cup, manually operated means extending outside of said diamond shaped slot for controlling said delivering device, a ball catching device comprising means for deflecting a ball toward said opening, and means for returning a ball from said catching to said delivering device comprising an inclined runway positioned beneath said board to receive a ball falling through said opening, and mechanism for elevating such ball from the lowest point of said runway and depositing it in said ball receiving cup.

4. In a device of the class described, in combination, a horizontal board having an opening therethrough and also provided with a diamond shaped slot constituting a trackway, means for making figures move in said trackway, a ball delivering device comprising a member pivotally mounted within said diamond shaped slot at a point below said board to swing in a vertical plane and provided with a ball receiving cup, manually operated means extending outside of said diamond shaped slot for controlling said delivering device, a ball catching device comprising means for deflecting a ball toward said opening, and means for returning a ball from said catching to said delivering device comprising an inclined runway positioned beneath said board to receive a ball falling through said opening, and mechanism for elevating such ball from the lowest point of said runway and depositing it in said ball receiving cup, said mechanism including an oscillatory element arranged to engage and lift the ball.

5. In a device of the class described, in combination, a horizontal board having an opening therethrough and also provided with a diamond shaped slot constituting a trackway, means for making figures move in said trackway, a ball delivering device comprising a member pivotally mounted within said diamond shaped slot at a point below said board to swing in a vertical plane and provided with a ball receiving cup, manually operated means extending outside of said diamond shaped slot for controlling said delivering device, a ball catching device comprising means for deflecting a ball toward said opening, and means for returning a ball from said catching to said delivering device comprising an inclined runway positioned beneath said board to receive a ball falling through said opening, and mechanism for elevating such ball from the lowest point of said runway and depositing it in said ball receiving cup, said mechanism including a lever pivotally mounted at one end to oscillate in a vertical plane and arranged to engage the ball at its other end.

6. In a device of the class described, in combination, a horizontal board having an opening therethrough and also provided with a diamond shaped slot constituting a trackway, means for making figures move in said trackway, a ball delivering device comprising a member pivotally mounted within said diamond shaped slot at a point below said board to swing in a vertical plane and provided with a ball receiving cup, manually operated means extending outside of said diamond shaped slot for controlling said delivering device, a batting device pivotally mounted adjacent one corner of the diamond shaped slot, a ball catching device comprising means located behind the batting device for deflecting toward said opening any ball which passes the batting device, and means for returning a ball from said catching to said delivering device comprising an inclined runway positioned beneath said board to receive a ball falling through said opening, and mechanism for elevating such ball from the lowest point of said runway and depositing it in said ball receiving cup.

7. In a device of the class described, in combination, a horizontal board provided with base positions and having an opening therethrough adjacent one of said base positions representing home plate, a ball delivering device comprising a member pivoted at a point below said board to swing in a vertical plane and provided with a ball receiving cup, a ball catching device comprising means located behind the home plate position for deflecting a ball toward said opening, and means for returning a ball from said catching to said delivering device comprising an inclined runaway positioned beneath said board to receive a ball falling through said opening, and mechanism for elevating such ball from the lowest point of said runway and depositing it in said ball receiving cup, said mechanism including an oscillatory element arranged to engage and lift the ball.

8. In a device of the class described, in combination, a horizontal board having an opening therethrough and also provided with a diamond shaped slot constituting a trackway, means for making figures move in said trackway, a ball delivering device comprising a member pivotally mounted within said diamond shaped slot at a point below said board to swing in a vertical plane and provided with a ball receiving cup, manually operated means extending outside of said diamond shaped slot for controlling said delivering device, a ball catching device comprising means for deflecting a ball toward said opening, and means for returning a ball from said catching to said delivering device comprising an inclined runway positioned beneath said board to receive a ball falling through said opening, and mechanism including an element located in advance of said ball delivering device for elevating such ball from the lowest point of said runway and causing the same to move rearwardly into said ball receiving cup.

9. In a device of the class described, in combination, a horizontal board having an opening therethrough and also provided with a diamond shaped slot constituting a trackway, means for making figures move in said trackway, a ball delivering device comprising a member pivotally mounted within said diamond shaped slot at a point below said board to swing in a vertical plane and provided with a ball receiving cup, manually operated means extending outside of said diamond shaped slot for controlling said delivering device, a batting device pivotally mounted adjacent one corner of the diamond shaped slot, a ball catching device comprising means for deflecting a ball toward said opening, and means for returning a ball from said catching to said delivering device comprising an inclined runway positioned beneath said board to receive a ball falling through said opening, and mechanism located between the cup of said ball delivering device and said batting device for elevating such ball from said runway to a point above said cup, and causing the same to roll rearwardly into said cup.

10. In a device of the class described, in combination, a horizontal board provided with base positions and having an opening therethrough adjacent one of said base positions representing home plate, a ball delivering device comprising a member pivoted at a point below said board to swing in a vertical plane and provided with a ball receiving cup, a ball catching device comprising means located behind the home plate position for deflecting a ball toward said opening, and means for returning a ball from said catching to said delivering device comprising an inclined runway positioned beneath said board to receive a ball falling through said opening, and mechanism including an element located between the home plate position and the pivot of said ball delivering device for elevating such ball from said runway and depositing it in said ball receiving cup.

In testimony whereof I, the assignee of the entire interest, affix my signature.

HARRY M. GRIMES, *Deceased*,
By HACKLEY MORRISON,
*Assignee of the Entire Interest.*